(12) United States Patent
Sun

(10) Patent No.: US 9,794,911 B2
(45) Date of Patent: Oct. 17, 2017

(54) METHOD AND RADIO NETWORK NODE FOR DETERMINING ROUTE UPDATE RADIUS

(71) Applicant: Telefonaktiebolaget LM Ericsson (publ), Stockholm (SE)

(72) Inventor: Qian Sun, Guangdong (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/110,906

(22) PCT Filed: Jan. 24, 2014

(86) PCT No.: PCT/CN2014/071345
§ 371 (c)(1),
(2) Date: Jul. 11, 2016

(87) PCT Pub. No.: WO2015/109517
PCT Pub. Date: Jul. 30, 2015

(65) Prior Publication Data
US 2016/0338003 A1 Nov. 17, 2016

(51) Int. Cl.
*H04W 72/00* (2009.01)
*H04W 68/02* (2009.01)
(Continued)

(52) U.S. Cl.
CPC ............ *H04W 68/02* (2013.01); *H04W 48/16* (2013.01); *H04W 84/042* (2013.01); *H04W 88/12* (2013.01)

(58) Field of Classification Search
CPC . H04W 28/0205; H04W 36/22; H04W 40/12; H04W 40/248; H04W 48/18;
(Continued)

(56) References Cited

U.S. PATENT DOCUMENTS 8,204,517 B1  6/2012  Rai et al.
8,311,551 B1  11/2012  Shetty et al.
(Continued)

FOREIGN PATENT DOCUMENTS

WO    2006079210 A1    8/2006

OTHER PUBLICATIONS

International Search Report and Written Opinion for International Patent Application No. PCT/CN2014/071345, dated Nov. 19, 2014, 12 pages.

*Primary Examiner* — Jean Gelin
(74) *Attorney, Agent, or Firm* — Withrow & Terranova, PLLC

(57) ABSTRACT

The present disclosure provides a method implemented by a radio network node for determining a Route Update Radius (RUR) for a Radio Base Station (RBS) and the radio network node. The method comprises determining a first radius (RUR_CCH) which defines a largest circular area centered at the RBS and excluding a first number of RBSs among the RBS's neighboring RBSs, wherein CCH occupancies for the first number of RBSs are higher than a CCH occupancy threshold. The method further comprises determining a second radius (RUR_ACH) which defines a smallest circular area centered at the RBS and covering a second number of RBSs among the RBS's neighboring RBSs, wherein ACH occupancies for the second number of RBSs are higher than an ACH occupancy threshold. The RUR is determined based on a comparison between the first radius (RUR_CCH) and the second radius (RUR_ACH).

16 Claims, 14 Drawing Sheets

(51) Int. Cl.
*H04W 48/16* (2009.01)
*H04W 84/04* (2009.01)
*H04W 88/12* (2009.01)

(58) Field of Classification Search
CPC ... H04W 68/02; H04W 48/16; H04W 84/042;
H04W 88/12; H04W 28/0289
USPC ......... 455/446, 449, 450, 451, 452.1, 452.2,
455/444, 448, 443
See application file for complete search history.

(56) References Cited

U.S. PATENT DOCUMENTS 8,351,938 B1    1/2013   Shetty et al.
9,179,438 B1 * 11/2015   Jintaseranee ......... H04W 68/02

* cited by examiner

METHOD AND RADIO NETWORK NODE FOR DETERMINING ROUTE UPDATE RADIUS

This application is a 35 U.S.C. §371 national phase filing of International Application No. PCT/CN2014/071345, filed Jan. 24, 2014, the disclosure of which is incorporated herein by reference in its entirety.

TECHNICAL FIELD

The present disclosure generally relates to the technical field of wireless communications, and particularly, to a method implemented by a radio network node for determining a Route Update Radius (RUR) for a Radio Base Station (RBS) and the associated radio network node.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

To efficiently page terminal devices, a so-called Distance Based Paging (DBP) method has been proposed and used in cellular networks. When the DBP method is applied in a cellular network, each RBS in the cellular network broadcasts an RUR. As a result, a terminal device, which registered its location with the network as a location of an RBS (denoted as a first RBS), must have received an RUR broadcast by the first RBS. If the terminal device moves away from the first RBS for a distance larger than the RUR, it will send out a Route Update Message (RUM). Upon receipt of the RUM at another RBS (denoted as a second RBS), the registered location of the terminal device will be updated with the second RBS's location. In case the terminal device is needed to be paged, all RBSs located in a paging area defined by a radius from the latest updated location of the terminal device (i.e., the location of the RBS which receives the RUM most recently) would send out paging messages, wherein the radius is equal to an RUR broadcast by the RBS which receives the RUM most recently.

In the prior art, RURs are manually configured for RBSs by network operators. In a case where the topology of a network changes (such as when additional RBSs are deployed in the network, when one or more RBSs are relocated in the network, or the like), the RURs for the RBSs are manually adjusted. The manual configuration and adjustment of RURs impose heavy burdens on the network operators, particularly for large-scale networks including hundreds or thousands of RBSs.

To ensure a high paging success rate, a network operator tends to set a large RUR for an RBS. Sometimes, such a strategy may cause an undesirable scenario, where the RUR defines a paging area centered at the RBS and covering a neighboring RBS whose Control CHannel (CCH) is busy, as illustrated in FIG. 1. In such a scenario, if a terminal device is paged in the paging area, the CCH of the neighboring RBS might be overloaded by paging messages intended for the terminal device and communications to/from the neighboring RBS might be adversely impacted and even interrupted.

Occasionally, for an RBS, the network operator might set a relatively small RUR which defines a paging area centered at the RBS and excluding a neighboring RBS whose Access CHannel (ACH) is busy, as illustrated in FIG. 2. In such a case, if one or more terminal devices move into the neighboring RBS out of the paging area, the ACH of the neighboring RBS might be undesirably overloaded by RUR messages sent from the terminal devices.

SUMMARY

An object of the present disclosure is to overcome at least one of the drawbacks described above.

To achieve this object, according to a first aspect of the present disclosure, there is provided a method implemented by a radio network node for determining an RUR for an RBS. The method comprises determining a first radius (RUR_CCH) which defines a largest circular area centered at the RBS and excluding a first number of RBSs among the RBS's neighboring RBSs, wherein CCH occupancies for the first number of RBSs are higher than a CCH occupancy threshold. The method further comprises determining a second radius (RUR_ACH) which defines a smallest circular area centered at the RBS and covering a second number of RBSs among the RBS's neighboring RBSs, wherein ACH occupancies for the second number of RBSs are higher than an ACH occupancy threshold. The RUR is determined based on a comparison between the first radius (RUR_CCH) and the second radius (RUR_ACH).

According to a second aspect of the present disclosure, there is provided a radio network node for determining an RUR for an RBS. The radio network node comprises a first radius determination section, a second radius determination section and an RUR determination section. The first radius determination section is configured to determine a first radius (RUR_CCH) which defines a largest circular area centered at the RBS and excluding a first number of RBSs among the RBS's neighboring RBSs, wherein CCH occupancies for the first number of RBSs are higher than a CCH occupancy threshold. The second radius determination section is configured to determine a second radius (RUR_ACH) which defines a smallest circular area centered at the RBS and covering a second number of RBSs among the RBS's neighboring RBSs, wherein ACH occupancies for the second number of RBSs are higher than an ACH occupancy threshold. The RUR determination section is configured to determine the RUR based on a comparison between the first radius (RUR_CCH) and the second radius (RUR_ACH).

With the proposed method and the radio network node, manual labor is no longer needed to configure and adjust an RUR for an RBS. Instead, the RUR can be automatically configured based on the RBS and its neighboring RBSs' locations as well as the neighboring RBSs' CCH occupancies and ACH occupancies. If a change in the locations and/or the traffic conditions of the RBSs occurs, the RUR can be automatically adjusted.

In addition, by determining the RUR based on a comparison between the first radius (RUR_CCH) and the second radius (RUR_ACH), it is possible for the determined RUR to define a largest possible paging area which excludes all neighboring RBSs with busy CCHs while covers all neighboring RBSs with busy ACHs. Accordingly, it is possible to maximize the paging success rate without causing CCH and ACH overloads for the RBS's neighboring RBSs.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF EMBODIMENTS

Figure 1:
FIG. 1 is a schematic diagram illustrating an undesirable scenario where an RUR defines a paging area covering a neighboring RBS with a busy CCH.
Figure 2:
FIG. 2 is a schematic diagram illustrating an undesirable scenario where an RUR defines a paging area excluding a neighboring RBS with a busy ACH.

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Since various wireless systems may benefit from exploiting the ideas covered within this disclosure as will be appreciated by those skilled in the art, terms like "RBS" and "terminal device" as used herein should be understood in a broad sense. Specifically, the RBS should be understood to encompass a legacy base station in a Second Generation (2G) network, a NodeB in a Third Generation (3G) network, an evolved NodeB in an evolved 3G network, an access point in a Wireless Local Area Network (WLAN), and the like. The terminal device should be understood to encompass a mobile telephone, a smartphone, a wireless-enabled tablet or personal computer, a wireless machine-to-machine unit, and the like.

Figure 3:
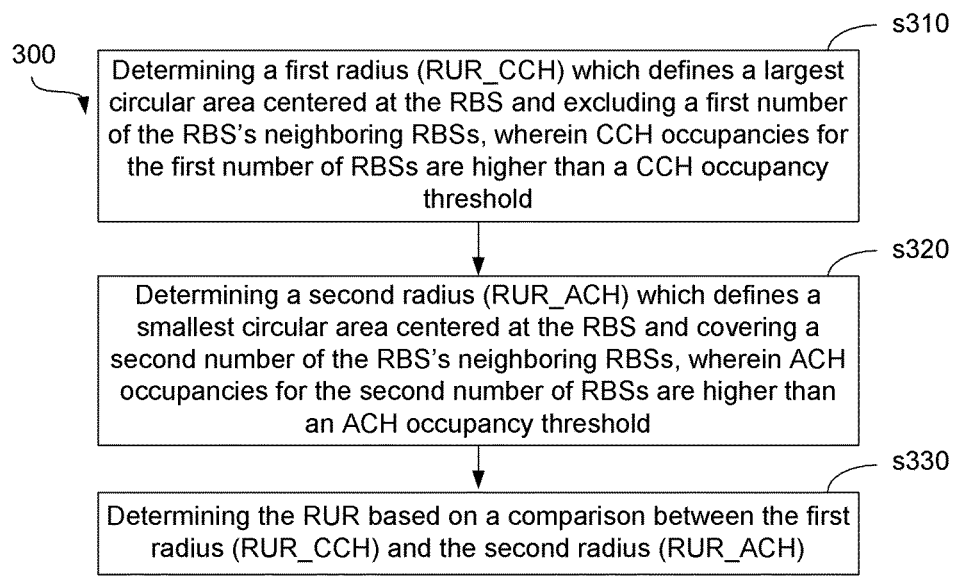
FIG. 3 is a flowchart illustrating a method implemented by a radio network node for determining an RUR for an RBS according to the present disclosure.

In the following, a method 300 implemented by a radio network node for determining an RUR for an RBS according to the present disclosure will be described with reference to FIG. 3. The radio network node may be the RBS itself or a Radio Network Controller (RNC) associated with the RBS. As mentioned above, the radio network node is not limited to RBS or RNC but may be any other network node (such as Base Station Controller (BSC), NodeB, eNodeB, etc.) in various radio network systems (such as 2G systems, 3G systems, Long Term Evolution (LTE) systems, LTE-Advanced systems, etc.)

As illustrated, initially, at step s310, a first radius (RUR_CCH) which defines a largest circular area centered at the RBS and excluding a first number of RBSs among the RBS's neighboring RBSs is determined, wherein CCH occupancies for the first number of RBSs are higher than a CCH occupancy threshold.

Figure 4:
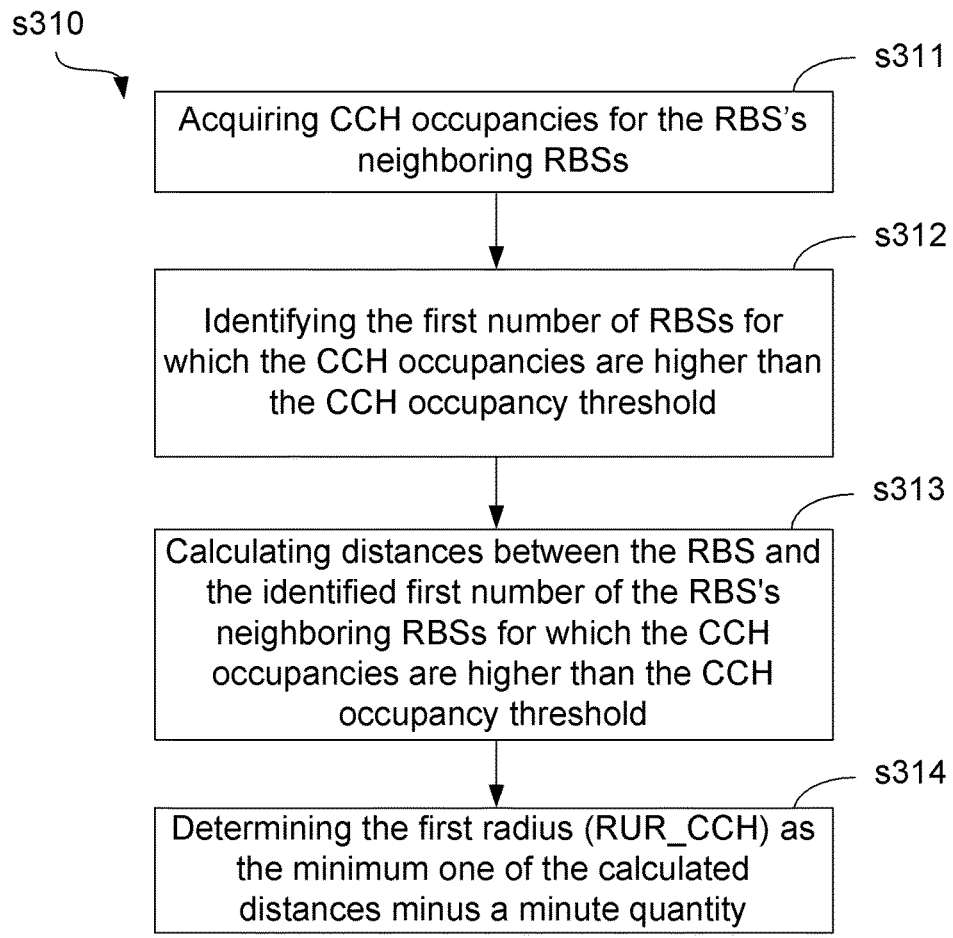
FIG. 4 is a flowchart illustrating exemplary operations for determining a first radius (RUR_CCH) which defines a largest circular area centered at an RBS and excluding a first number of RBSs among the RBS's neighboring RBSs according to the present disclosure, wherein CCH occupancies for the first number of RBSs are higher than a CCH occupancy threshold.

In FIG. 4, a specific procedure for determining the first radius (RUR_CCH) is exemplified. As illustrated, initially, CCH occupancies for the RBS's neighboring RBSs are acquired, at step s311. Then, the first number of RBSs for which the CCH occupancies are higher than the CCH occupancy threshold are identified, at step s312. Next, distances between the RBS and the identified first number of RBSs, for which the CCH occupancies are higher than the CCH occupancy threshold, are calculated, at step s313. Subsequently, the first radius (RUR_CCH) is determined as the minimum one of the calculated distances minus a minute quantity, at step s314.

Figure 5:
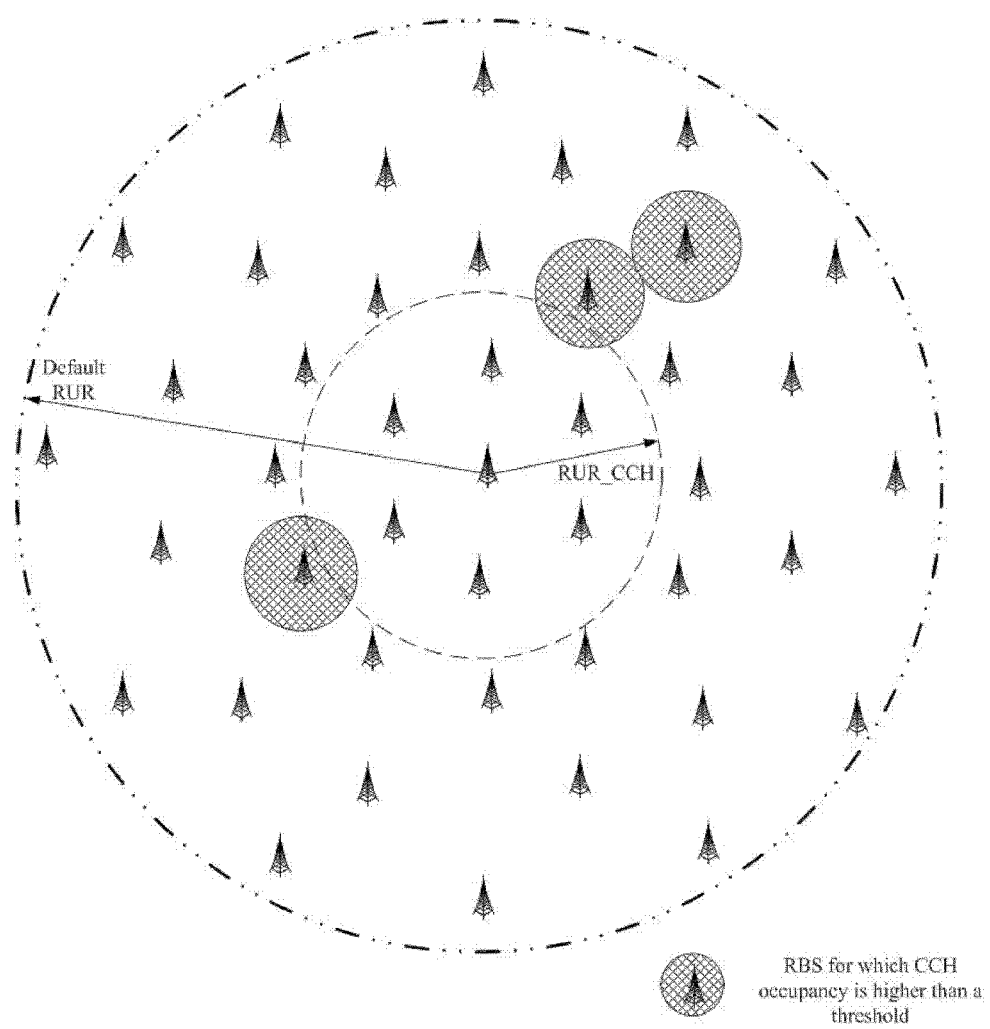
FIG. 5 is a schematic diagram illustrating an exemplary result obtained by performing the operations illustrated in FIG. 4.

For the sake of illustration, FIG. 5 presents an exemplary scenario as a result of performing the above procedure. As can be seen in the figure, among the RBS's neighboring RBSs, there are identified three RBSs for which CCH occupancies are higher than a CCH occupancy threshold. According to the RBS and its neighboring RBSs' locations (which may be represented in terms of longitudes and latitudes and may be known from site planning), distances between the RBS and the identified three RBSs can be calculated. Being determined as the minimum one of the calculated distances minus a minute quantity, the first radius (RUR_CCH) defines a largest circular area centered at the RBS and excluding the identified three neighboring RBSs.

As those skilled in the art will appreciate, the RBS's neighboring RBSs are not confined to those in the RBS's neighbor list but refer to all other RBSs located in a circular area defined by a radius from the RBS. As illustrated in FIG. 5, the radius may be simply specified as a default radius large enough to define an area covering a considerable number of RBSs. Alternatively, the radius may be dynamically determined to ensure a given paging success rate.

In case there is no neighboring RBS for which the CCH occupancy is higher than the CCH occupancy threshold, the default RUR may be determined as the first radius (RUR_CCH).

As used herein, the minute quantity refers to a quantity much smaller than the calculated distances. Being determined as the minimum one of the calculated distances minus such a small quantity, the first radius (RUR_CCH) may define a largest possible circular area excluding the identified neighboring RBSs with busy CCHs. By way of example, the minute quality may be set to a fixed amount on the order of several meters.

Referring back to FIG. 3, at step s320, a second radius (RUR_ACH) which defines a smallest circular area centered at the RBS and covering a second number of RBSs among the RBS's neighboring RBSs is determined, wherein ACH occupancies for the second number of RBSs are higher than an ACH occupancy threshold.

Figure 6:
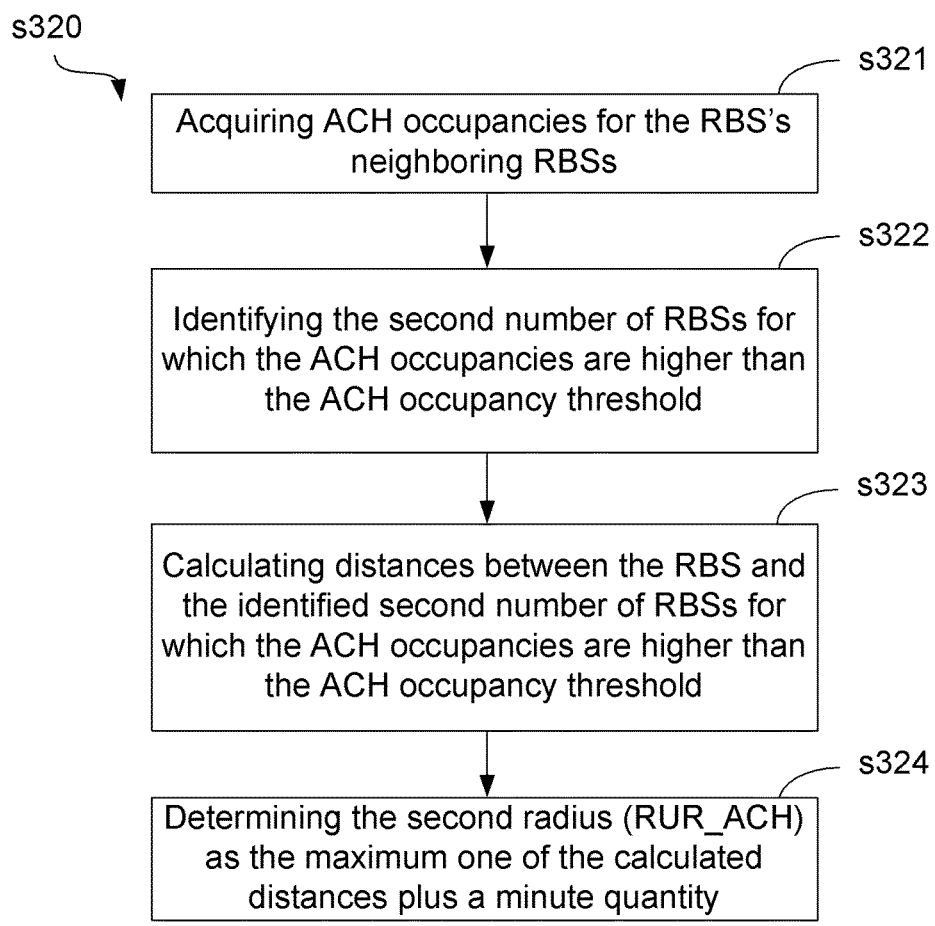
FIG. 6 is a flowchart illustrating exemplary operations for determining a second radius (RUR_ACH) which defines a smallest circular area centered at an RBS and covering a second number of RBSs among the RBS's neighboring RBSs according to the present disclosure, wherein ACH occupancies for the second number of RBSs are higher than an ACH occupancy threshold.

In FIG. 6, a specific procedure for determining the second radius (RUR_ACH) is exemplified. As illustrated, initially, ACH occupancies for the RBS's neighboring RBSs are acquired, at step s321. Then, the second number of RBSs for which the ACH occupancies are higher than the ACH occupancy threshold are identified at step s322. Next, distances between the RBS and the identified second number of RBSs, for which the ACH occupancies are higher than the ACH occupancy threshold, are calculated at step s323. Subsequently, the second radius (RUR_ACH) is determined as the maximum one of the calculated distances plus a minute quantity, at step s324. As those skilled in the art will appreciate, the minute quantity used for step s324 may be different from the minute quantity used for step 314.

Figure 7:
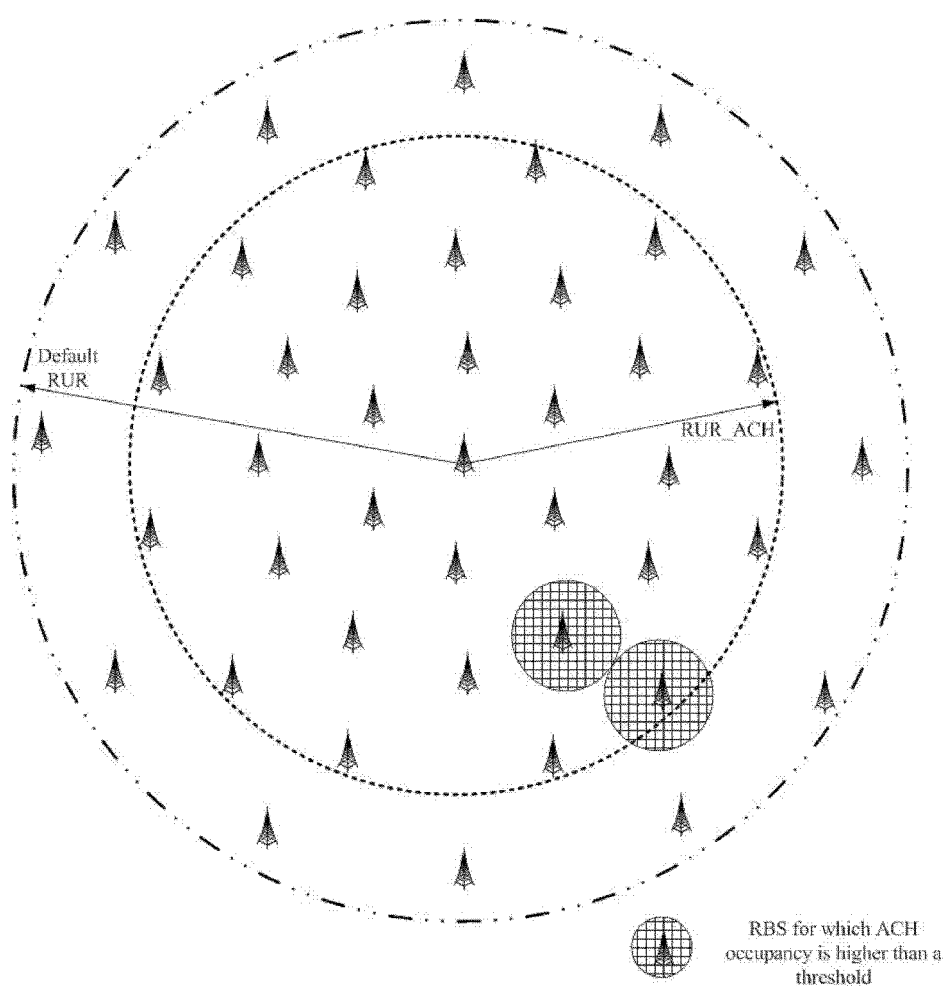
FIG. 7 is a schematic diagram illustrating an exemplary result obtained by performing the operations illustrated in FIG. 6.

For the sake of illustration, FIG. 7 presents an exemplary scenario as a result of performing the above procedure. As can be seen in the figure, among the RBS's neighboring RBSs, there are identified two RBSs for which ACH occupancies are higher than an ACH occupancy threshold. According to the RBS and its neighboring RBSs' locations (which may be represented in terms of longitudes and latitudes and may be known from site planning), distances between the RBS and the identified two RBSs can be calculated. Being determined as the maximum one of the calculated distances plus a minute quantity, the second radius (RUR_ACH) defines a smallest circular area centered at the RBS and covering the identified two neighboring RBSs.

In case there is no neighboring RBS for which the ACH occupancy is higher than the ACH occupancy threshold, the default RUR may be determined as the second radius (RUR_ACH).

Referring back to FIG. 3, at step s330, the RUR is determined based on a comparison between the first radius (RUR_CCH) and the second radius (RUR_ACH).

Figure 8:
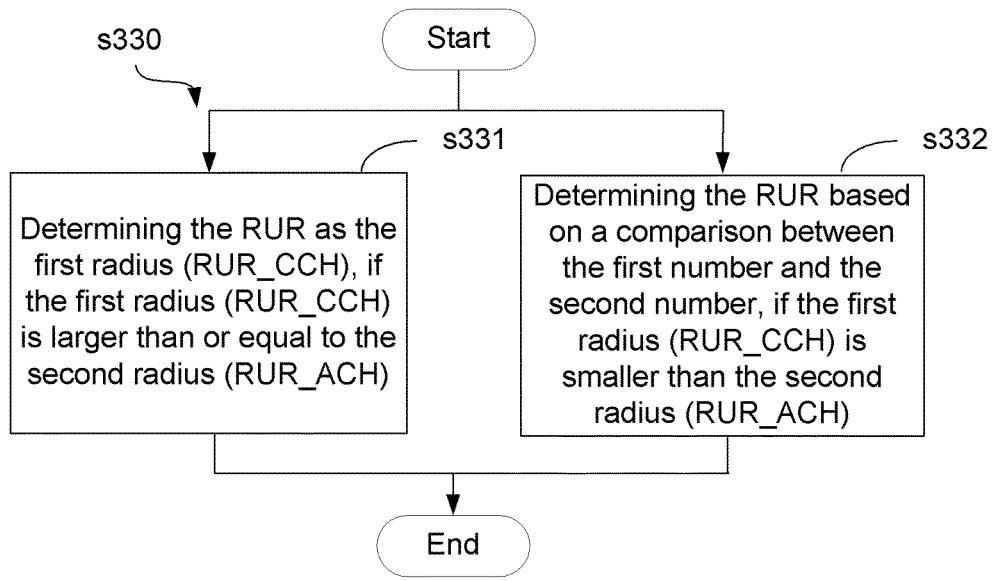
FIG. 8 is a flowchart illustrating exemplary operations for determining an RUR based on a comparison between the first radius (RUR_CCH) and the second radius (RUR_CCH) according to the present disclosure.

In FIG. 8, a specific procedure for determining the RUR based on a comparison between the first radius (RUR_CCH) and the second radius (RUR_ACH) is exemplified. As illustrated, if the first radius (RUR_CCH) is larger than or equal to the second radius (RUR_ACH), the RUR is then determined as the first radius (RUR_CCH), at step s331.

Figure 10:
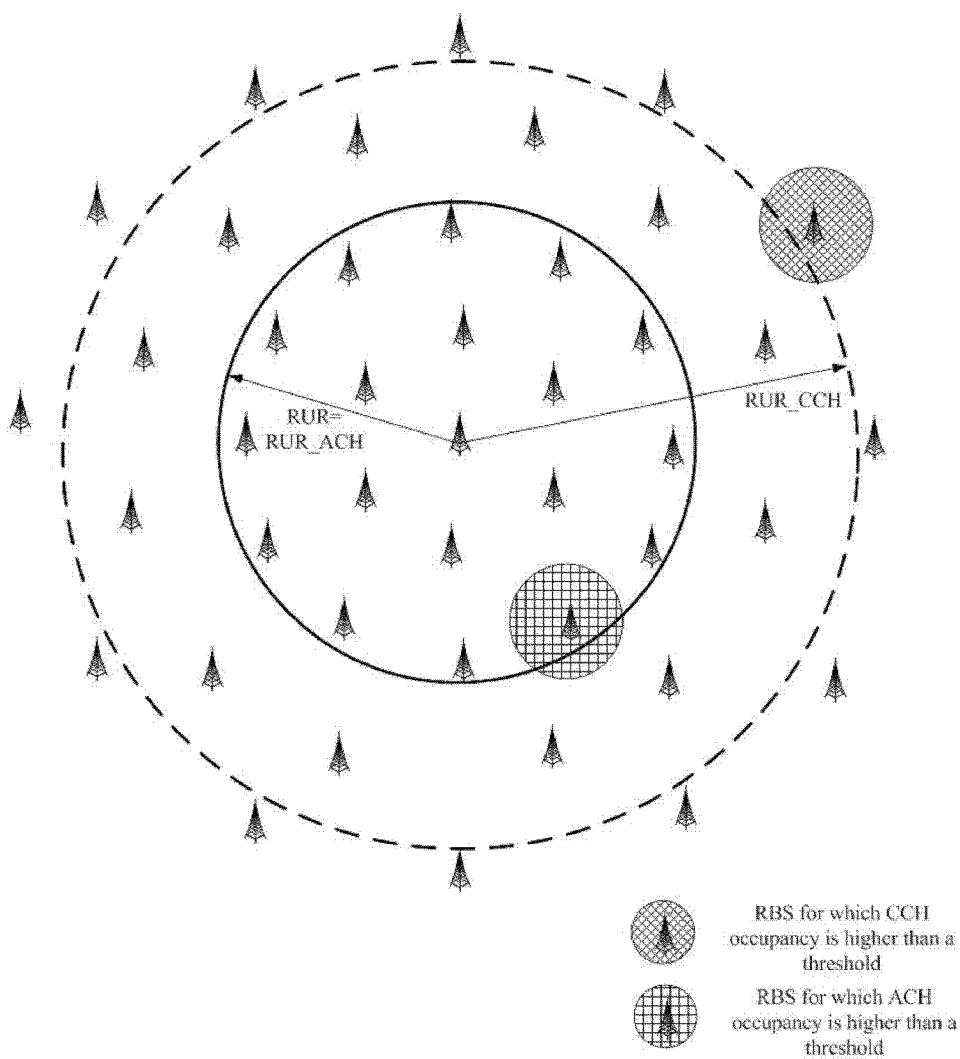
FIGS. 10-13 are schematic diagrams illustrating exemplary results obtained by performing the operations illustrated in FIGS. 8 and 9.

For the sake of illustration, FIG. 10 presents an exemplary scenario where the first radius (RUR_CCH) is larger than or equal to the second radius (RUR_ACH). In this case, the RUR is determined as the first radius (RUR_CCH), as illustrated in the figure. As such, the paging area defined by the RUR excludes the RBS's neighboring RBS with a busy CCH while covers the RBS's neighboring RBS with a busy ACH. Accordingly, CCH overload and ACH overload are avoided for the RBS's neighboring RBSs.

Referring back to FIG. 8, if the first radius (RUR_CCH) is smaller than the second radius (RUR_ACH), it is preferable to determine the RUR based on a comparison between the first number of the neighboring RBSs with busy CCHs and the second number of the neighboring RBSs with busy ACHs, at step s332.

Figure 9:
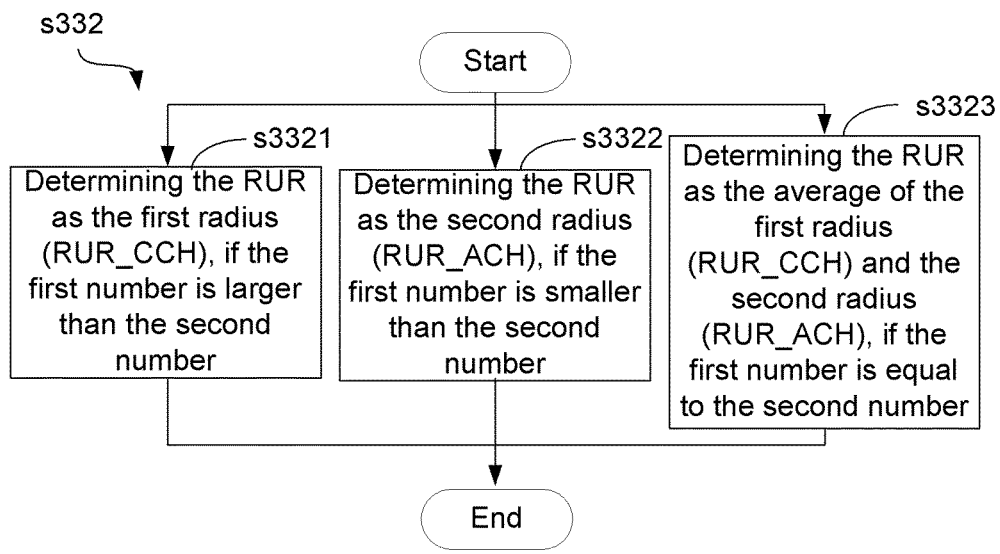
FIG. 9 is a flowchart illustrating exemplary operations for determining an RUR based on a comparison between the first number and the second number in case the first radius (RUR_CCH) is smaller than the second radius (RUR_CCH) according to the present disclosure.

According to exemplary operations illustrated in FIG. 9 for implementing step s332, if the first number is larger than the second number, the RUR is then determined as the first radius (RUR_CCH), at step s3321. If the first number is smaller than the second number, the RUR is determined as the second radius (RUR_ACH), at step s3322. If the first number is equal to the second number, the RUR is determined as an average of the first radius (RUR_CCH) and the second radius (RUR_ACH), at step s3323.

Figure 11:
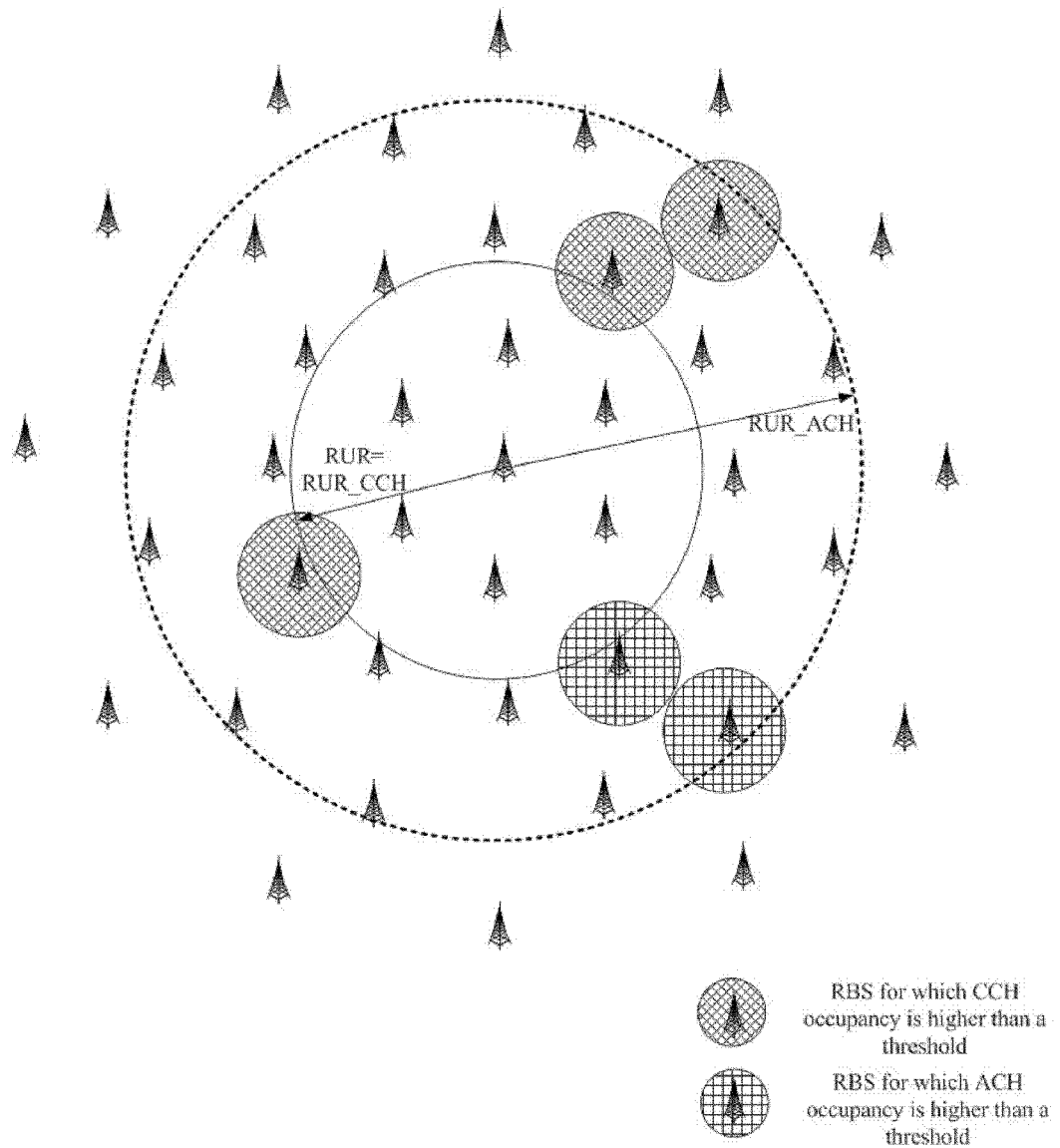

For the sake of illustration, FIG. 11 presents an exemplary scenario where the first radius (RUR_CCH) is smaller than the second radius (RUR_ACH) and the first number is larger than the second number. In this case, it is preferred that the RUR is determined as the first radius (RUR_CCH), as illustrated in the figure. As a result, the paging area defined by the RUR excludes the RBS's three neighboring RBSs with busy CCHs but does not cover the RBS's two neighboring RBSs with busy ACHs. Accordingly, CCH overload is avoided for more neighboring RBSs with busy CCHs at the expense of potential ACH overload for less neighboring RBSs with busy ACHs.

Figure 12:
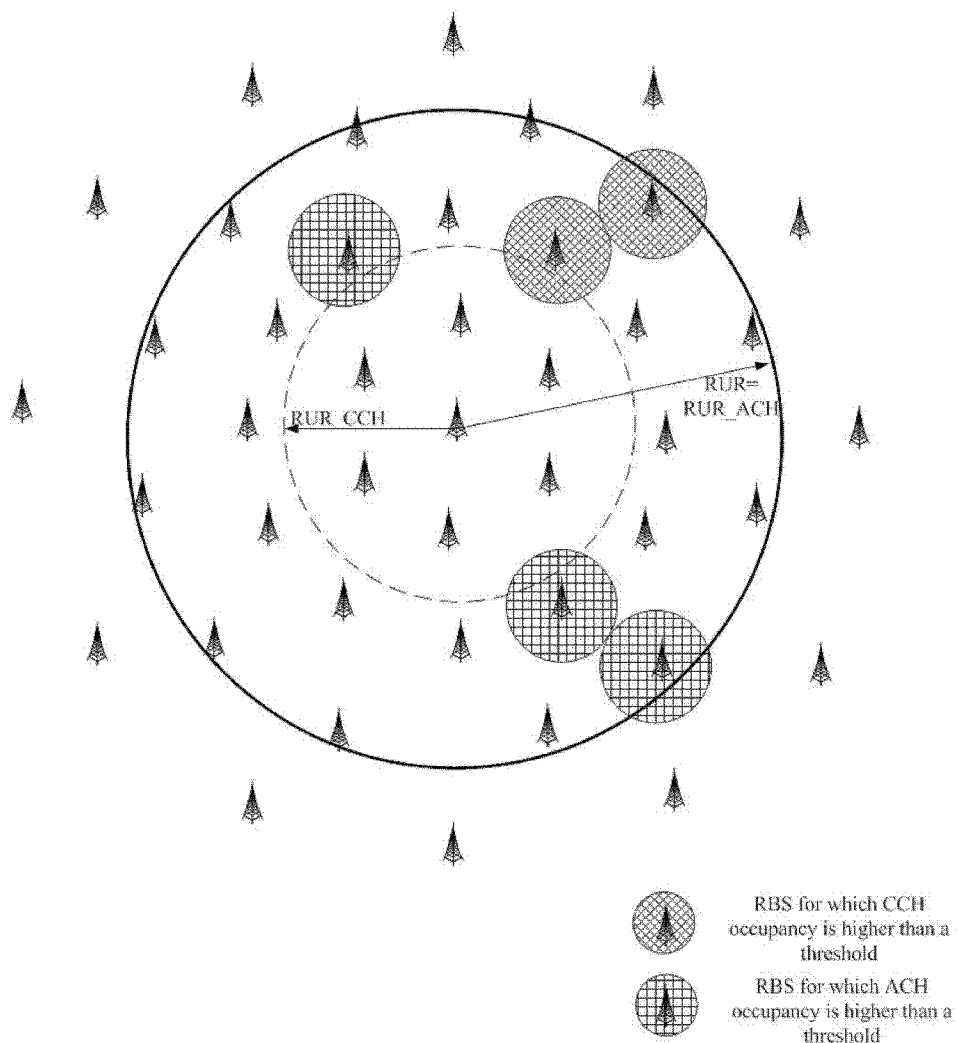

FIG. 12 presents an exemplary scenario where the first radius (RUR_CCH) is smaller than the second radius (RUR_ACH) and the first number is smaller than the second number. In this case, it is preferred that the RUR is determined as the second radius (RUR_ACH), as illustrated in the figure. As a result, the paging area defined by the RUR does not exclude the RBS's two neighboring RBSs with busy CCHs but covers the RBS's three neighboring RBSs with busy ACHs. Accordingly, ACH overload is avoided for more neighboring RBSs with busy ACHs at the expense of potential CCH overload for less neighboring RBSs with busy CCHs.

Figure 13:
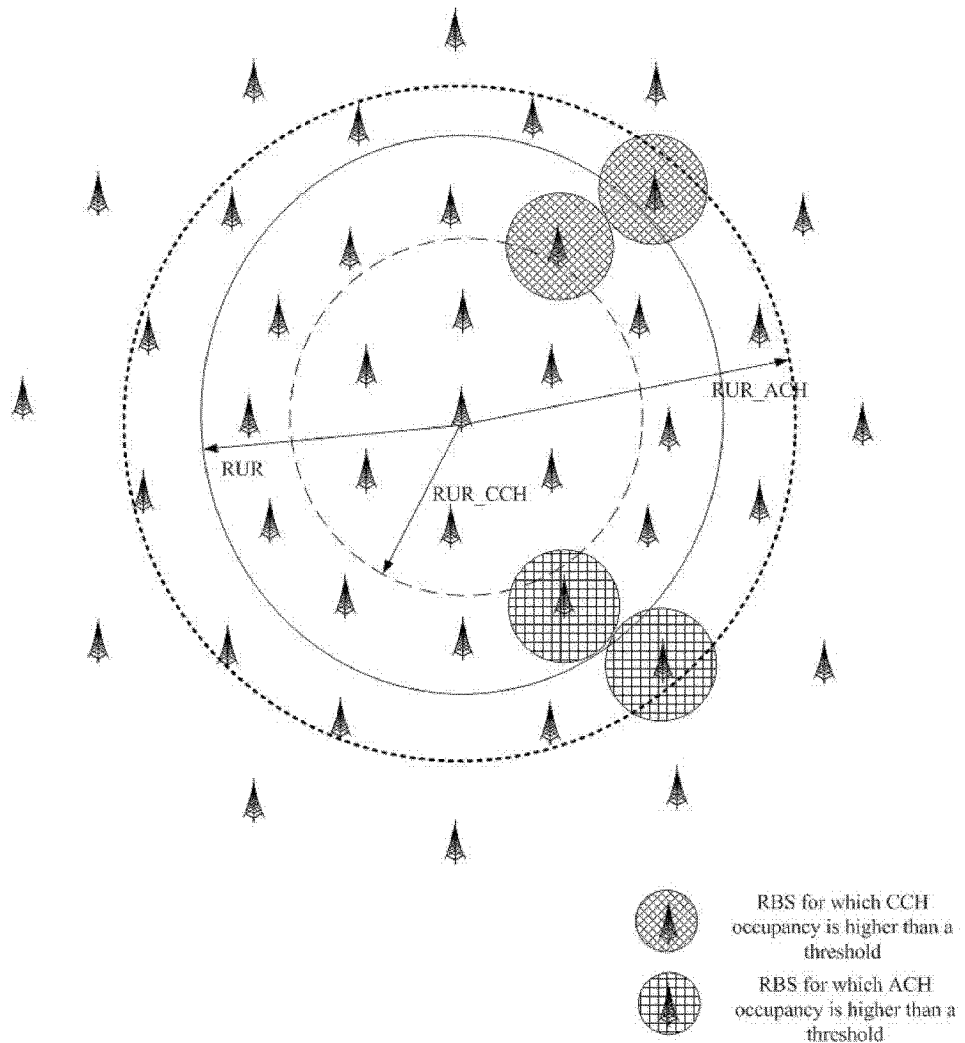

FIG. 13 presents an exemplary scenario where the first radius (RUR_CCH) is smaller than the second radius (RUR_ACH) and the first number is equal to the second number. In this case, the RUR is determined as an average of the first radius (RUR_CCH) and the second radius (RUR_ACH), as illustrated in the figure. As a result, the paging area defined by the RUR excludes one of the RBS's two neighboring RBSs with busy CCHs and cover one of the RBS's two neighboring RBSs with busy ACHs. Accordingly, CCH overload and ACH overload may be alleviated for the RBS's neighboring RBSs.

As those skilled in the art will appreciate, the procedures described above with respect to FIGS. 8 and 9 are not restrictive but open to various alternations and modifications where the first radius (RUR_CCH) and the second radius (RUR_ACH) are both considered and thus both CCH occupancy and ACH occupancy are considered or balanced. By way of example, instead of determining the RUR based on a comparison between the first number of the neighboring RBSs with busy CCHs and the second number of the neighboring RBSs with busy ACHs, the RUR may be consistently determined as the average of the first radius (RUR_CCH) and the second radius (RUR_ACH) or even as the default RUR, in a case where the first radius (RUR_CCH) is smaller than the second radius (RUR_ACH). In addition to determining the RUR as the average of the first radius (RUR_CCH) and the second radius (RUR_ACH) if the first number is equal to the second number, the RUR may be determined as the average of the first radius (RUR_CCH) and the second radius (RUR_ACH) if the first number is close to the second number.

With some embodiments of the proposed method 300, no manual labor is needed for configuring and adjusting the RUR. Instead, the RUR can be automatically configured based on the RBS and its neighboring RBSs' locations as well as the neighboring RBSs' CCH occupancies and ACH occupancies. If a change in the locations and/or the traffic conditions of the RBSs occurs, the RUR can be automatically adjusted.

Additionally, based on a comparison between the first radius (RUR_CCH) and the second radius (RUR_ACH), it is possible to determine an RUR which defines a largest possible paging area excluding the RBS's neighboring RBSs with busy CCHs while covering the RBS's neighboring RBSs with busy ACHs. Accordingly, the paging success rate may be maximized without causing CCH and ACH overloads for the RBS's neighboring RBSs.

In the following, a structure of a radio network node 1400 for determining an RUR for an RBS according to the present disclosure will be described with reference to FIGS. 14-16.

Figure 14:
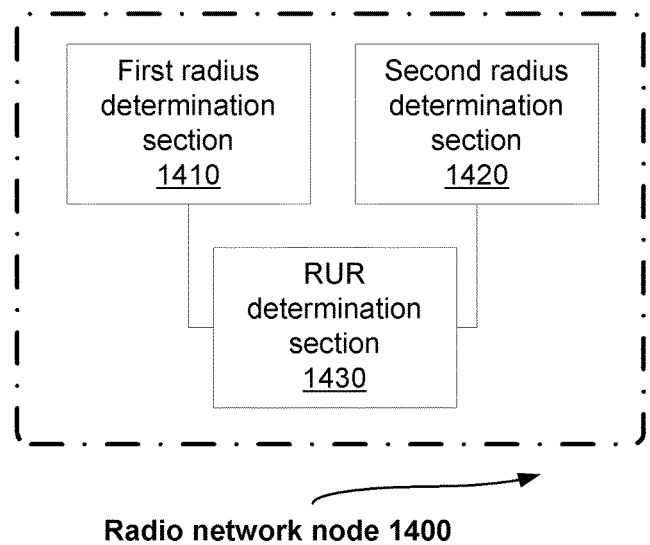
FIG. 14 is a block diagram illustrating a structure of a radio network node according to the present disclosure.

As illustrated in FIG. 14, the radio network node 1400 comprises a first radius determination section 1410, a second radius determination section 1420 and an RUR determination section 1430. The first radius determination section 1410 is configured to determine a first radius (RUR_CCH) which defines a largest circular area centered at the RBS and excluding a first number of RBSs among the RBS's neighboring RBSs, wherein CCH occupancies for the first number of RBSs are higher than a CCH occupancy threshold. The second radius determination section 1420 is configured to determine a second radius (RUR_ACH) which defines a smallest circular area centered at the RBS and covering a second number of RBSs among the RBS's neighboring RBSs, wherein ACH occupancies for the second number of RBSs are higher than an ACH occupancy threshold. The RUR determination section 1430 is configured to determine the RUR based on a comparison between the first radius (RUR_CCH) and the second radius (RUR_ACH).

Figure 15:
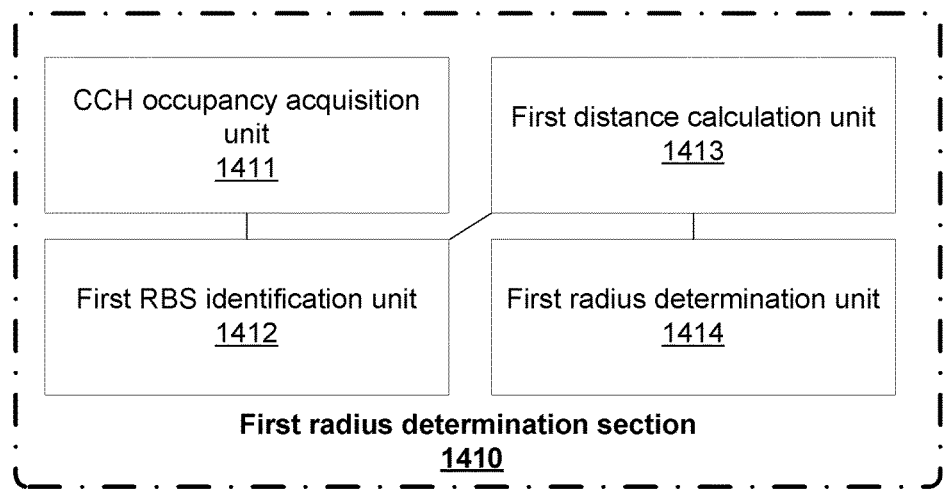
FIGS. 15 and 16 are block diagrams illustrating structures of modules of the radio network node according to the present disclosure.

In an embodiment, the first radius determination section 1410 may comprise a CCH occupancy acquisition unit 1411, a first RBS identification unit 1412, a first distance calculation unit 1413 and a first radius determination unit 1414, as illustrated in FIG. 15. The CCH occupancy acquisition unit 1411 may be configured to acquire CCH occupancies for the RBS's neighboring RBSs. The first RBS identification unit 1412 may be configured to identify the first number of RBSs for which the CCH occupancies are higher than the CCH occupancy threshold. The first distance calculation unit 1413 may be configured to calculate distances between the RBS and the identified first number of RBSs for which the CCH occupancies are higher than the CCH occupancy threshold. The first radius determination unit 1414 may be configured to determine the first radius (RUR_CCH) as the minimum one of the calculated distances minus a minute quantity.

Figure 16:
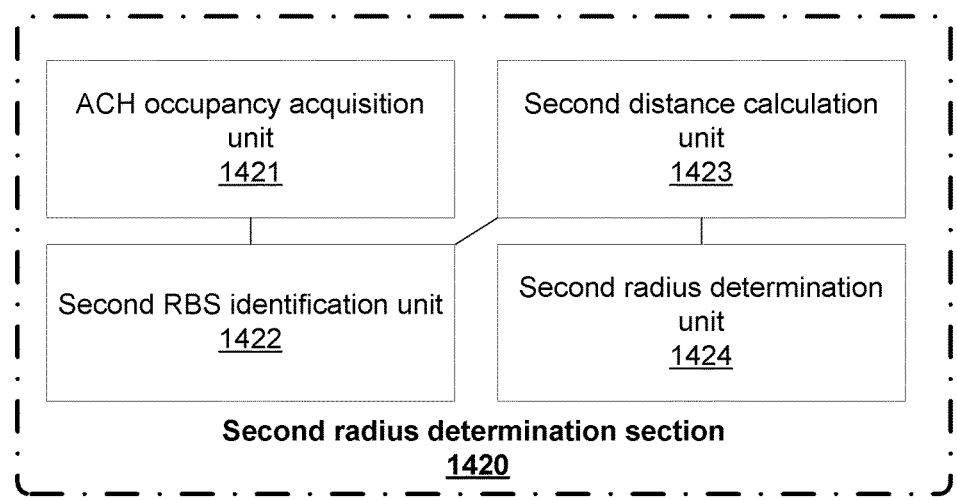

In an embodiment, the second radius determination section 1420 may comprise an ACH occupancy acquisition unit 1421, a second RBS identification unit 1422, a second distance calculation unit 1423 and a second radius determination unit 1424, as illustrated in FIG. 16. The ACH occupancy acquisition unit 1421 may be configured to acquire ACH occupancies for the RBS's neighboring RBSs. The second RBS identification unit 1422 may be configured to identify the second number of RBSs for which the ACH occupancies are higher than the ACH occupancy threshold. The second distance calculation unit 1423 may be configured to calculate distances between the RBS and the identified second number of RBSs for which the ACH occupancies are higher than the ACH occupancy threshold. The second radius determination unit 1424 may be configured to determine the second radius (RUR_ACH) as the maximum one of the calculated distances plus a minute quantity.

In an embodiment, the RUR determination section 1430 may be configured to determine the RUR as the first radius (RUR_CCH), if the first radius (RUR_CCH) is larger than or equal to the second radius (RUR_ACH) and to determine the RUR based on a comparison between the first number and the second number, if the first radius (RUR_CCH) is smaller than the second radius (RUR_ACH).

In an embodiment, the RUR determination section 1430 may be further configured to determine the RUR as the first radius (RUR_CCH), if the radius (RUR_CCH) is smaller than the second radius (RUR_ACH) and the first number is larger than the second number, to determine the RUR as the second radius (RUR_ACH), if the first radius (RUR_CCH) is smaller than the second radius (RUR_ACH) and the first number is smaller than the second number, and to determine the RUR as an average of the first radius (RUR_CCH) and the second radius (RUR_ACH), if the first radius (RUR_CCH) is smaller than the second radius (RUR_ACH) and the first number is equal to the second number.

As those skilled in the art will appreciate, the first radius determination section 1410, the second radius determination section 1420 and the RUR determination section 1430 may be implemented separately as suitable dedicated circuits. Nevertheless, the above-described sections can also be implemented using any number of dedicated circuits through functional combination or separation. In some embodiments, the above-described sections may be even combined in a single application specific integrated circuit (ASIC).

As an alternative software-based implementation, the radio network node may comprise a memory and a processor (including but not limited to a microprocessor, a microcontroller or a Digital Signal Processor (DSP), etc.) The memory stores machine-readable program code executable by the processor to cause the radio network node to perform the above-described method 300.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method implemented by a radio network node for determining a Route Update Radius (RUR) for a Radio Base Station (RBS), comprising:
   determining a first radius (RUR_CCH) which defines a largest circular area centered at the RBS and excluding a first number of RBSs among the RBS's neighboring RBSs, wherein Control CHannel (CCH) occupancies for the first number of RBSs are higher than a CCH occupancy threshold;
   determining a second radius (RUR_ACH) which defines a smallest circular area centered at the RBS and covering a second number of RBSs among the RBS's neighboring RBSs, wherein Access CHannel (ACH) occupancies for the second number of RBSs are higher than an ACH occupancy threshold; and
   determining the RUR based on a comparison between the first radius (RUR_CCH) and the second radius (RUR_ACH), wherein determining the RUR comprises:
      if the first radius (RUR_CCH) is larger than or equal to the second radius (RUR_ACH), determining the RUR as the first radius (RUR_CCH); and
      if the first radius (RUR_CCH) is smaller than the second radius (RUR_ACH), determining the RUR based on a comparison between the first number and the second number.

2. The method of claim 1, wherein the determining the first radius (RUR_CCH) comprises:
   acquiring CCH occupancies for the RBS's neighboring RBSs;
   identifying the first number of RBSs for which the CCH occupancies are higher than the CCH occupancy threshold;
   calculating distances between the RBS and the identified first number of RBSs; and
   determining the first radius (RUR_CCH) as the minimum one of the calculated distances minus a minute quantity.

3. The method of claim 1, wherein the determining the second radius (RUR_ACH) comprises:
   acquiring ACH occupancies for the RBS's neighboring RBSs;
   identifying the second number of RBSs for which the ACH occupancies are higher than the ACH occupancy threshold;
   calculating distances between the RBS and the identified second number of RBSs; and
   determining the second radius (RUR_ACH) as the maximum one of the calculated distances plus a minute quantity.

4. The method of claim 1, wherein the determining the RUR based on the comparison between the first number and the second number comprises:
   if the first number is larger than the second number, determining the RUR as the first radius (RUR_CCH);
   if the first number is smaller than the second number, determining the RUR as the second radius (RUR_ACH); and
   if the first number is equal to the second number, determining the RUR as an average of the first radius (RUR_CCH) and the second radius (RUR_ACH).

5. The method of claim 1, wherein the RBS's neighboring RBSs are one or more RBSs other than the RBS which are located in a circular area defined by a default RUR from the RBS.

6. The method of claim 5, wherein the default RUR is determined as the first radius (RUR_CCH), if there is no neighboring RBS for which the CCH occupancy is higher than the CCH occupancy threshold.

7. The method of claim 6, wherein the default RUR is determined as the second radius (RUR_ACH), if there is no neighboring RBS for which the ACH occupancy is higher than the CCH occupancy threshold.

8. The method of claim 1, wherein the radio network node is the RBS or a Radio Network Controller (RNC).

9. A radio network node for determining a Route Update Radius (RUR) for a Radio Base Station (RBS), comprising:
   a first radius determination section configured to determine a first radius (RUR_CCH) which defines a largest circular area centered at the RBS and excluding a first number of RBSs among the RBS's neighboring RBSs, wherein Control CHannel (CCH) occupancies for the first number of RBSs are higher than a CCH occupancy threshold;
   a second radius determination section configured to determine a second radius (RUR_ACH) which defines a smallest circular area centered at the RBS and covering a second number of RBSs among the RBS's neighboring RBSs, wherein Access CHannel (ACH) occupancies for the second number of RBSs are higher than an ACH occupancy threshold; and an RUR determination section configured to determine the RUR based on a comparison between the first radius (RUR_CCH) and the second radius (RUR_ACH), wherein the RUR determination section is configured to determine the RUR as the first radius (RUR_CCH), if the first radius (RUR_CCH) is larger than or equal to the second radius (RUR_ACH), and to determine the RUR based on a comparison between the first number and the second number, if the first radius (RUR_CCH) is smaller than the second radius (RUR_ACH).

10. The radio network node of claim 9, wherein the first radius determination section comprises:
    a CCH occupancy acquisition unit configured to acquire CCH occupancies for the RBS's neighboring RBSs;
    a first RBS identification unit configured to identify the first number of RBSs for which the CCH occupancies are higher than the CCH occupancy threshold;
    a first distance calculation unit configured to calculate distances between the RBS and the identified first number of RBSs for which the CCH occupancies are higher than the CCH occupancy threshold; and
    a first radius determination unit configured to determine the first radius (RUR_CCH) as the minimum one of the calculated distances minus a minute quantity.

11. The radio network node of claim 9, wherein the second radius determination section comprises:
    an ACH occupancy acquisition unit configured to acquire ACH occupancies for the RBS's neighboring RBSs;
    a second RBS identification unit configured to identify the second number of RBSs for which the ACH occupancies are higher than the ACH occupancy threshold;

a second distance calculation unit configured to calculate distances between the RBS and the identified second number of RBSs for which the ACH occupancies are higher than the ACH occupancy threshold; and a second radius determination unit configured to determine the second radius (RUR_ACH) as the maximum one of the calculated distances plus a minute quantity.

12. The radio network node of claim 9, wherein the RUR determination section is further configured to determine the RUR as the first radius (RUR_CCH), if the radius (RUR_CCH) is smaller than the second radius (RUR_ACH) and the first number is larger than the second number, determine the RUR as the second radius (RUR_ACH), if the first radius (RUR_CCH) is smaller than the second radius (RUR_ACH) and the first number is smaller than the second number, and determine the RUR as an average of the first radius (RUR_CCH) and the second radius (RUR_ACH), if the first radius (RUR_CCH) is smaller than the second radius (RUR_ACH) and the first number is equal to the second number.

13. The radio network node of claim 9, wherein the RBS's neighboring RBSs are one or more RBSs other than the RBS which are located in a circular area defined by a default RUR from the RBS.

14. The radio network node of claim 13, wherein the first radius determination section is configured to determine the default RUR as the first radius (RUR_CCH), if there is no neighboring RBS for which the CCH occupancy is higher than the CCH occupancy threshold.

15. The radio network node of claim 13, wherein the second radius determination section is configured to determine the default RUR as the second radius (RUR_ACH), if there is no neighboring RBS for which the ACH occupancy is higher than the CCH occupancy threshold.

16. The radio network node of claim 9, wherein the radio network node is the RBS or a Radio Network Controller (RNC).

\* \* \* \* \*